INVENTORS.
JAMES F. SULLIVAN
LOREN G. ARNOLD

United States Patent Office 3,302,728
Patented Feb. 7, 1967

3,302,728
PLOW SAFETY STANDARD
James F. Sullivan, East Moline, and Loren G. Arnold, Rock Island, Ill., assignors to Deere & Company, Moline, Ill., a corporation of Delaware
Filed Nov. 20, 1964, Ser. No. 412,703
3 Claims. (Cl. 172—265)

The invention relates generally to agricultural implements and more particularly to ground-working implements, such as plows or the like.

The object and general nature of this invention consists in the provision of new and improved plow safety standard means in which means are provided to permit a plow bottom to slide up and over small obstructions and additional means are provided for releasing a plow whenever it strikes a large rock or other unyielding obstruction, so as to prevent damage to the plow bottom or the plow frame or other parts associated therewith. Specifically, it is a feature of this invention to provide a safety standard having a first mechanism which permits a plow bottom to pass over relatively small obstructions, and a second cooperating overload trip mechanism so constructed and arranged as to permit the plow bottom to trip and swing rearwardly and upwardly relative to the plow frame after striking an unyielding obstruction but not downwardly, whereby the tripped bottom is not ever required to lift any part of the entire plow. Thus, the plow safety standard mechanisms of this invention are admirably adapted to be incorporated in multiple bottom heavy duty plows.

More specifically, it is a feature of this invention to provide a safety standard having two forms of action. For example, in one form of action, if the plow bottom encounters an obstruction protruding above the ground and permitting sliding upward movement, the plow will move generally directly upwardly, thus preventing excessive loads in the plow structure. If the plow bottom can slide over the obstruction solely by the upward movement of the bottom relative to the frame, then the bottom will not, according to this invention, be completely released from the plow frame but will, instead, automatically return to its normal working position. If, however, the plow bottom does not clear the obstruction after an upward movement of approximately three to four inches, then the plow bottom will trip and be completely released and freely swingable upwardly and rearwardly, thereby imposing no lifting loads of any kind on the plow frame or other associated parts.

In the other form of action, if the plow bottom contacts an object which does not permit sliding upward movement of the plow bottom, such as a root or a boulder having a vertical face towards the plow bottom, the bottom will trip in the same manner as above. However, it is an object of this invention that the force required to trip a plow bottom be greater when the bottom is in its normal working position, as when a root is encountered, than when the plow bottom is in its raised position relative to the frame, as when an obstruction is encountered which permits upward sliding movement of the plow.

These and other objects and advantages of this invention will be apparent to those skilled in the art after a consideration of the following detailed description on the preferred structure which is shown by way of illustration in the accompanying drawings, in which.

Figure 1:
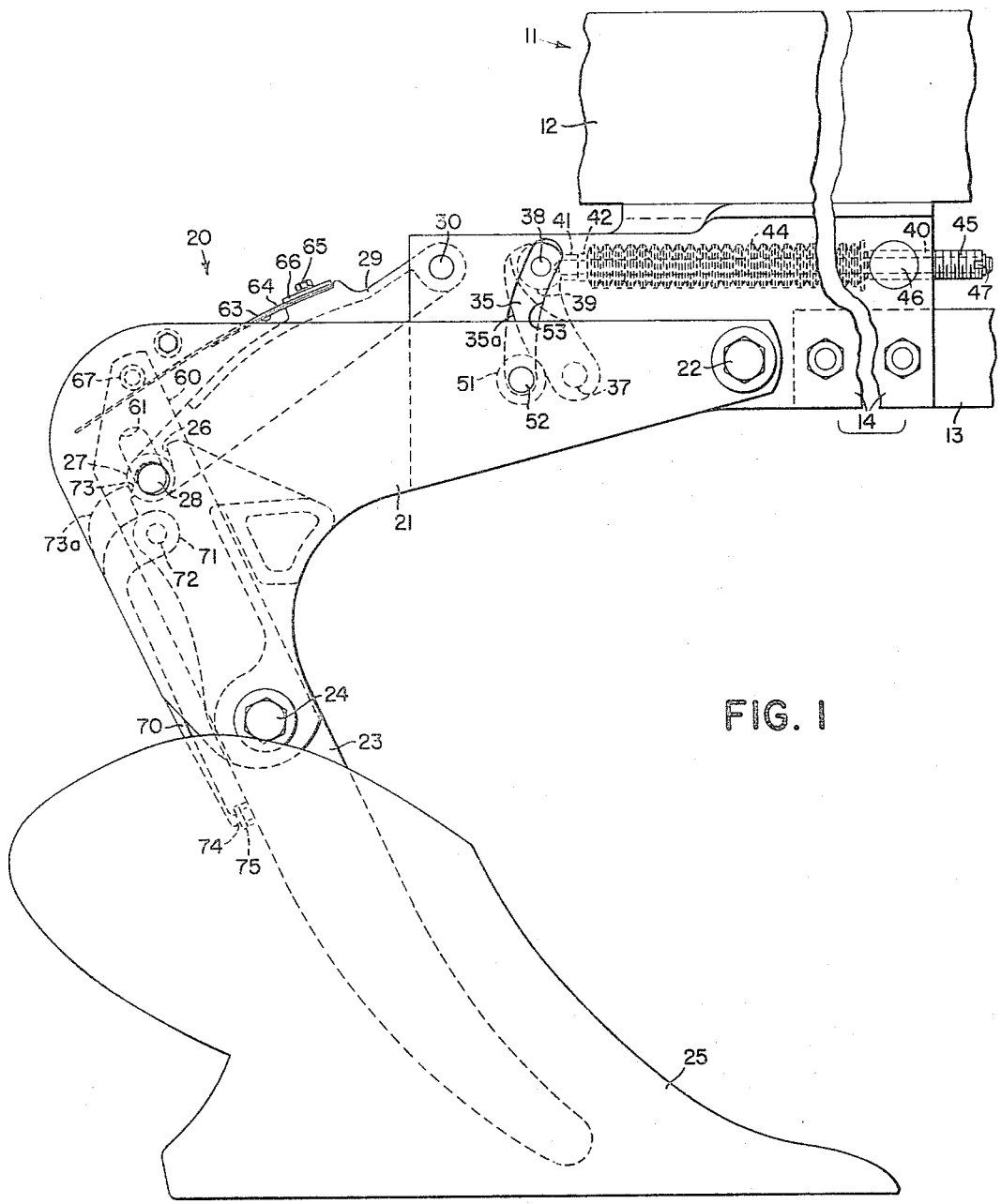
FIG. 1 is a side view of a plow safety standard, incorporating the principles of this invention, showing the same in its normal working position.

Referring first to FIG. 1, the main frame of the plow is shown fragmentarily at 11 and is represented by the generally diagonally extending beam 12. As mentioned above this invention is particularly concerned with a multi-bottom plow of the heavy duty type and accordingly a plurality of plow beams 13 are connected by a plurality of brackets 14 to the diagonal beam 12 and/or other frame parts. The brackets 14 are arranged in pairs, there being one pair for each plow beam 13, and the brackets form a part of and act as a support for the mechanism that forms the principal part of this invention. The brackets 14 are disposed on opposite sides of the beam 13.

Figure 2:
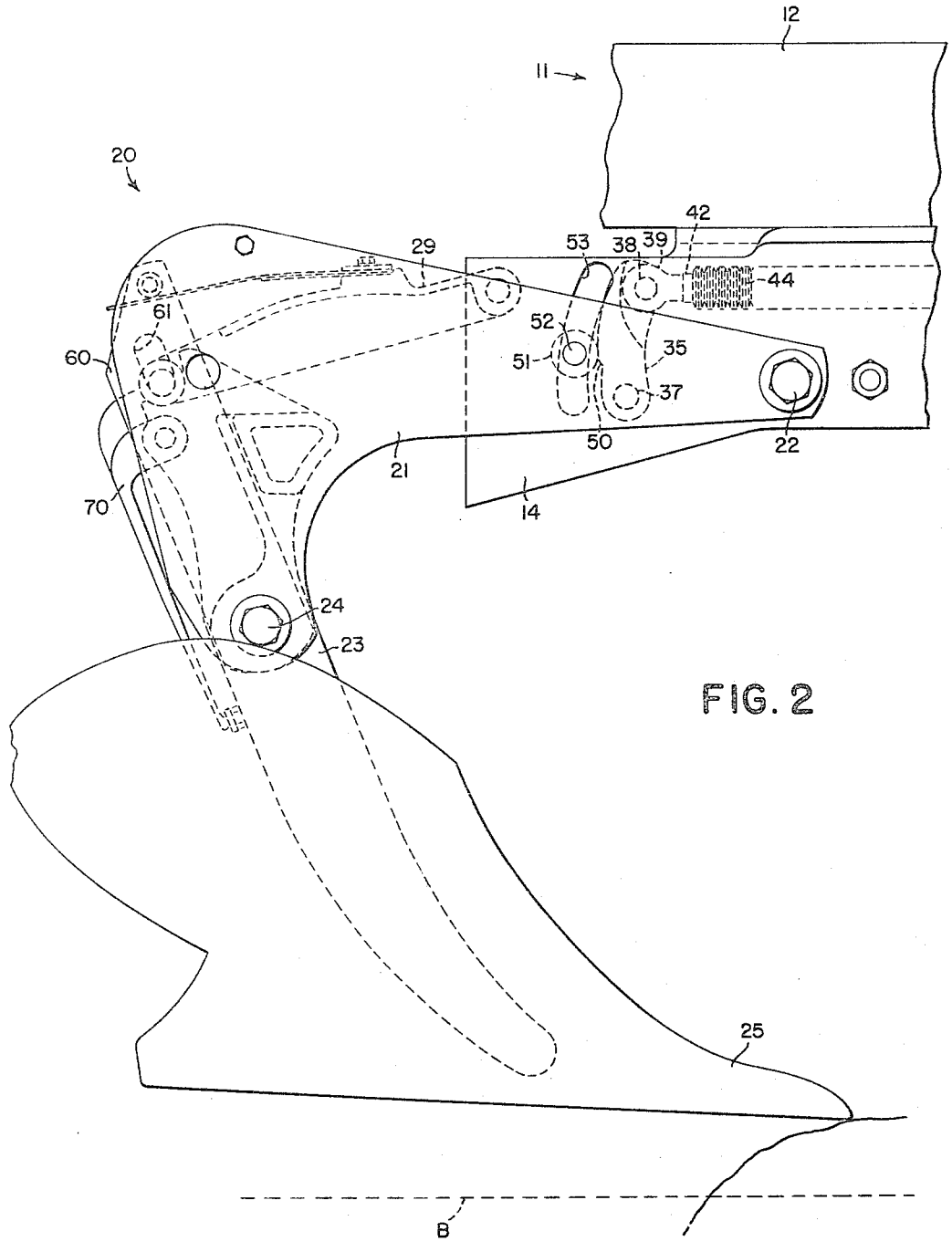
FIG. 2 is a view similar to FIG. 1, showing the plow safety standard in which the plow bottom has been moved substantially directly upwardly relative to the main frame of the plow into a position of reduced depth of plowing.

The safety standard mechanism which is indicated in its entirety by the reference numeral 20, includes a trip beam in the form of a pair of generally L-shaped links 21 each serving as a link pivotally connected at its ends to the associated bracket 14 by a pivot 22 and to the generally intermediate portion of the generally vertically disposed plow standard 23 by a pivot 24. A plow bottom 25 is fixed rigidly to the lower end of the plow standard 23. The upper end of the plow standard 23 is provided with a normally upwardly facing notch 26 which normally receives a roller 27 carried on a pin 28 that is disposed in the end of a link 29. The latter is pivotally connected by a pin 30 to the rear upper corners of the bracket plates 14. Thus, the mechanism just described provides, in effect, a pair of links 21, 29 connecting the plow standard 23 with the associated plow beam 13, 14 for movement relative thereto about four pivot points 22, 24, 28 and 30. These points are so located that the plow standard 23 and the associated plow bottom 25 can swing upwardly and slightly rearwardly with a generally parallel movement, there being only a small amount of angular displacement in a clockwise direction (FIG. 2).

As mentioned above the safety standard mechanism of this invention is provided with a first mechanism which permits an upward movement of the plow bottom and plow standard 23 relative to the frame 11 as determined by the four pivot points 22, 24, 28 and 30 upon the occurrence of an excessive upward pressure exerted on the plow bottom. The means for yieldably opposing this excessive upward pressure will now be described.

Pivoted between the rear portions of the frame brackets 14 is an arm or cam 35, preferably in the form of a forging, pivoted on a pin 37 carried by the brackets 14. The upper end of the cam 35 is apertured to receive a pin 38 on which a rod end 39 is pivoted. A rod 40 has an end 41 screwed into the rod end member 39 and fixed in position by a lock nut 42. The rod 40 receives a plurality of conical spring or belleville washers 44, and the forward end of the rod 40 is smooth and is slidably supported in an adjusting screw 45 having a threaded exterior screwed into an adjusting nut 46 that is generally cylindrical and is mounted for rocking in suitable openings formed in the bracket plates 14. At one end the assembly of spring washers bear against the lock nut 42 and at the other end against the adjusting screw 45. By turning the latter, the effective tension exerted by the spring washers may be adjusted. To this end the outer portion of the member 45 is formed with opposed slots 47 to receive a spanner wrench or other tool. The cam 35 is provided with an abutment 50 at the rear side with which a roller 51 mounted on a roller stud 52 cooperates. The roller 51 is disposed between the bracket plates 14, being of sufficient length to fill the space therebetween, and the ends of the stud 52 extend through slots 53 in the bracket plates 14 and through apertures in the horizontal arms of the associated L-shaped links 21. The slots 53 are arcuate about the axis of pivot 22 as a center so as to accommodate upward swinging of the members 21, but ordinarily upward swinging cannot occur until the plow bottom is subjected to an excessive generally upwardly directed force, sufficient to force the roller 51 up over the hump 50 on the cam 35. This causes the latter to swing clockwise about the pivot 37 against the action of the springs 44. Turning the adjusting screw 45 will thus adjust the force necessary to overcome the resistance of the springs at which the roller 51 will ride over the hump 50 and permit the plow bottom to move generally upwardly and rearwardly at an angle of about 25° to the vertical. So long as the roller 27 remains in the notch 26, thus establishing a pivot at this point, this upward and rearward movement of the plow bottom is generally in a straight line, as determined by the location of the four pivots 22, 24, 28 and 30. It will also be noted that once the roller 51 is forced over the hump 50 further movement of the plow bottom is substantially without resistance, for the edge 35a of the pivoted cam 35 is generally arcuate about the axis of pivot 22 when the springs 44 are compressed. Thus, the plow bottom passes freely over obstructions or the like that tend merely to lift the plow bottom out of the ground and no lifting effort is exerted toward lifting the entire plow out of the ground.

If the obstruction encountered is, however, such that forward movement of the plow bottom is impeded or entirely prevented, as when the point of the plow becomes caught under a rock, a large root, or the like, or if the obstruction is too high to permit the plow to slide over it, then the plow is tripped by virtue of the mechanism now to be described.

Reference was made above to the roller 27 that normally lies in the notch 26 in the upper end of the plow standard 23, thus pivotally interconnecting the upper end of the plow standard 23 with the rear end of the upper link 29. A pair of straps 60 are disposed between the upper end of the plow standard 23 and the rear portions of the two L-shaped links 21, being apertured to receive the pivot 24. The upper end of each strap 60 is slotted, as at 61, to receive the ends of the pivot 28 on which the roller 27 is mounted. The link 29 is bifurcated at its rear end, forming two spaced apart sections that are apertured to also receive the ends of pivot 28. The link member 29 also has a flattened ledge section 63 that receives a leaf spring 64, the forward end of which is apertured to receive a cap screw 65 which, acting through a washer 66, serves to clamp the leaf spring 64 to the link 29. The outer end of the leaf spring 64 extends between the straps 60 and bears against a stud 67 that at its ends is riveted to the upper ends of the straps 60. The spring 64 thus serves normally to hold the roller 27 in the notch 26, exerting a relatively light pressure between the straps 60 and the roller pivot 28 to do so.

It will be seen particularly from FIG. 1, that rearwardly directed soil pressure against the plow bottom 25 in operation acts through the lower end of the plow standard 23 to swing the upper end of the latter forwardly, dislodging the roller 27 from the notch 26. In order to prevent this from happening until the rearward pressure becomes excessive we provide a heavy spring member 70, preferably in the form of a forging having apertured lugs 71 connected by means of a pivot pin 72 to the plow standard 23 adjacent the notch 26. The end 73a adjacent the pivot lugs 71 is hardened to form an abutment 73 engageable with the rear side of the roller 27 when the plow bottom is in its normal working position just above the plane passing through the axis of the roller 27 and the axis of the pivot 30. The lower part of the spring member 70, below the pivot 72, is formed with decreasing thickness and terminates in a rounded portion 74 that engages the head of an adjusting screw 75 threaded into a tapped hole in the adjacent portion of the plow standard 23. By turning the screw 75 to different positions the force exerted by the nose portion 73 of the spring member 70 against the roller 27 may be adjusted as desired. When the rearwardly directed pressure exerted against the plow bottom reaches some predetermined amount, as determined by the adjustment at 75, the spring 70 yields and the nose portion 73 moves rearwardly and downwardly about pivot 72 and as soon as the point of contact between the roller 27 passes below the plane passing through the axis of pivot 28 and the axis of pivot 30, the roller 27 will be dislodged from the notch 26, freeing the upper end of the plow standard 23 from its connection with the link 29. This permits the plow standard 23 to swing forwardly at its upper end and rearwardly at its lower end.

Preferably, the parts are so adjusted that materially greater rearwardly directed force is required to release the roller 27 from the notch 26 than is required to shift the roller 51 past the hump 50. Thus, upon the plow bottom encountering an obstruction, the plow bottom swings upwardly on the pivots 22, 24, 28 and 30, and if this relieves the excess pressure encountered, the plow bottom moves downwardly into normal plowing position automatically, and is locked in that position by the roller 51 moving back downwardly over the hump 50 in cam 35. But if the excess pressure is not released, then the spring 70 yields, freeing the upper end of the standard 23 and permitting the plow bottom to freely swing rearwardly. Even when the standard 23 is released from the link 29, the plow bottom may swing upwardly freely. Therefore, under no conditions may the tripped bottom impose any stress on the main frame or any other bottoms. Thus, there is substantially no likelihood of any excess pressures encountered in operation causing breakage of any parts.

Figure 3:
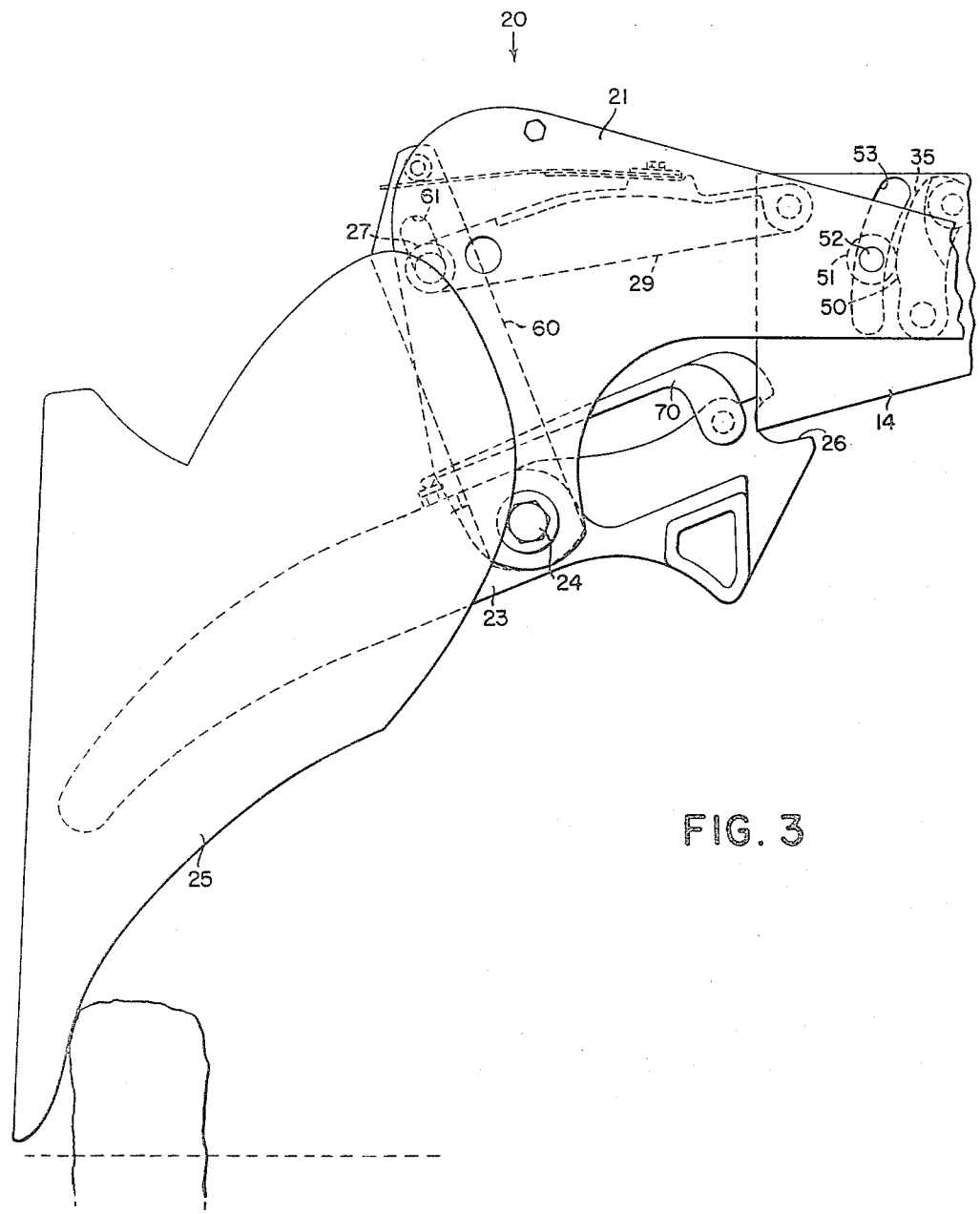
FIG. 3 is a view similar to FIG. 2, showing the safety standard mechanism in which the trip mechanism has released the plow bottom permitting the latter to swing backwardly and rearwardly with no tendency whatsoever to exert any lifting action on the plow frame.

It should also be noted that the parts are so adjusted that if the plow bottom has not cleared an obstruction after raising three or four inches, that the abutment 73 will then lie below the plane passing through the axis of the roller 27 and the axis of the pivot 30. Thus when the plow has been raised three to four inches above the bottom of the furrow (indicated by the broken line B) continued raising will cause the roller 27 to be dislodged from the notch 26, freeing the upper end of the plow standard and permitting the bottom to swing back in the manner illustrated in FIG. 3.

To reset a standard which has been tripped, it is only necessary to back up the plow as is conventional.

It will also be noted that we have provided two types or stages of releasing action, one including means yieldingly holding the plow bottom against generally upward movement, and the other including means yieldably holding the plow bottom against rearward movement. Either means serves independently of the other means to yieldably hold the plow bottom in working position.

While we have shown and described above the preferred structure in which the principles of this invention have been incorporated, it is to be understood that our invention is not to be limited to the particular details shown and described above but that, in fact, widely different means may be employed in the practice of the broader aspect of our invention.

What we claim, therefore, and desire to secure by Letters Patent is:

1. In a plow or the like, a main beam extending in a generally fore-and-aft direction, a generally vertical plow standard, a plow bottom fixed to the lower portion of said standard, a generally L-shaped member having an upper forwardly extending part and a lower downwardly extending part, first means pivotally connecting the forward portion of said forwardly extending part to said main beam, second means pivotally connecting the lower portion of said downwardly extending part to said standard below the upper end thereof, an upper link, third means pivotally connecting the upper link at its forward end to the main beam to the rear of the first means, fourth means pivotally connecting the rear end portion of said upper link with the upper portion of said standard, means yieldably restraining said L-shaped member against upward movement relative to said main beam, and means releasably connecting the rear portion of said upper link with the upper part of said standard.

2. In a plow or the like, a main beam extending in a generally fore-and-aft direction, a generally vertical plow standard, a plow bottom fixed to the lower portion of said standard, a first member pivoted at its forward portion to said main beam and at its rear portion to said standard below the upper portion thereof, a second member lying generally above said first member and pivotally connected at its forward end to said main beam, and releasable means pivotally interconnecting the rear end of said second member to the upper end of said standard, whereby said standard may swing backwardly and upwardly at its lower end relative to the first member upon release from said second member.

3. In a moldboard plow adapted to be propelled forwardly over the ground: a main beam; a generally vertically extending plow standard; a plow bottom fixed to the lower portion of said standard; linkage means connecting said standard with said main beam, said linkage means including a lower link pivotally interconnected at its rear portion to an intermediate portion of the standard, first pivot means pivotally connecting a forward portion of the lower link with the main beam, an upper link whose rear end is pivotally interconnected to an upper portion of the standard, and second pivot means pivotally connecting a forward portion of the upper link with the main beam, said linkage means permitting the tool to move generally vertically as the lower and upper links rotate about said first and second pivot means; and trip means cooperable with the upper link means to permit said tool to swing rearwardly and upwardly about the point of pivotal interconnection of the rear portion of the lower link with an intermediate portion of the standard.

References Cited by the Examiner
UNITED STATES PATENTS

| | | | |
|---|---|---|---|
| 1,219,342 | 3/1917 | Myers | 172—268 |
| 2,312,405 | 3/1943 | Haagen | 172—264 |
| 2,833,198 | 5/1958 | Graham | 172—710 |
| 2,850,957 | 9/1958 | Silver | 172—269 |
| 3,032,122 | 5/1962 | Geurts | 172—264 |
| 3,191,688 | 6/1965 | Morkoski et al. | 172—269 |

ANTONIO F. GUIDA, *Acting Primary Examiner.*

ABRAHAM G. STONE, *Examiner.*

J. R. OAKS, *Assistant Examiner.*